United States Patent Office 2,834,684
Patented May 13, 1958

2,834,684

STABILIZED BODIED MILK AND FROZEN MILK PRODUCTS COMPRISING CARBOXYMETHYL DEXTRAN

Harry A. Toulmin, Jr., Dayton, Ohio, assignor, by mesne assignments, to Midland Chemical Corporation, Dayton, Ohio, a corporation of Delaware No Drawing. Application June 17, 1954
Serial No. 437,584

3 Claims. (Cl. 99—136)

This invention relates to milk products and to methods of making them. More particularly the invention relates to frozen milk products such as ice cream and to improvements in the manufacture thereof.

In manufacturing ice cream, it is the practice to include in the composition a stabilizing and thickening agent which helps to impart a desirable body and smooth texture to the frozen product and to inhibit the growth of ice crystals therein during storage. To be entirely satisfactory, the stabilizer should be a substance which is fully effective as a bodying agent, maintains the smoothness of the product and substantially prevents the development of ice crystals over relatively long storage periods.

Moreover, the stabilizer should be low in cost, convenient to handle and to incorporate into the ice cream mix, of a type which does not impart or develop a foreign or undesirable flavor and free from characteristics which interfere with or increase the cost of manufacturing the frozen product. It must also remain unaffected by the low temperatures at which the ice cream is normally maintained prior to consumption thereof.

None of the stabilizers which have been available for use in ice cream mixes possesses all of the desired properties. The natural gums which have been available do not have them and for that reason have been used in ice cream manufacture only on a small scale.

The stabilizing value of gelatine, which has been widely used, has been found to depend on, or at least to be closely related to, the gel strength of its aqueous solution which makes standardization difficult. Gelatine has other drawbacks as a stabilizer and thickener for ice cream such as its effect in retarding whipping of the mix and the fact that, when gelatine is used, the mix must be cooled, and then aged from four to twenty-four hours, before it is frozen. It has also been observed that, often, gelatine causes ice cream with which it is mixed to develop an unpleasant "stale" flavor.

Water-soluble alginates have been used but, in general the alginates possess properties which render them unsuitable for addition to the mix without prior blending with other substances. Thus, the water-soluble alginates are not compatible with the calcium salts present in milk and therefore, in the past, they have been introduced into the ice cream mix in conjunction with a water-soluble phosphoric acid salt for rendering the alginate compatible with the constituents of the mix.

The alginates are not generally regarded as entirely satisfatcory because they are not convenient to use and interfere with smooth progress of the mix through the steps of manufacture of the frozen product. Thus, a relatively high temperature is required to dissolve the alginates in the mix, the mix is generally too viscous and tends to flow over the cooler very slowly, with a consequent reduction in the cooling rate, the alginates are susceptible to the action of salts occurring in varying amounts in milk from different sources, and at different times of the year, and are sometimes found to be incompatible with mixes having a developed acidity, so that neutralization of the mix prior to the addition of the alginate is required or at least advisable.

It is an object of this invention to provide new stabilized frozen milk products, such as ice cream, comprising stabilizing agents which are fully functional as bodying agents which impart a smooth texture to the frozen product and as regards prevention of crystallization therein, and which do not have the drawbacks of the known stabilizers.

Another object is to provide ice cream mixes comprising a new stabilizer and bodying agent and which flow with sufficient rapidity and in comparatively thin films over the cooler for practical purposes, do not require ageing of the mix between cooling and freezing thereof, do not develop a stale flavor, and in which the stabilizer can be directly incorporated very conveniently by the mixing equipment conventionally used in preparing mixes of this type.

Another object is to provide a method for making the stabilized frozen milk products.

These and other objects are attained by the present invention in accordance with which ice cream mixes and the like are stabilized and bodied by incorporating therewith a small amount of carboxymethyl dextran.

In accordance with the invention it is found that carboxymethyl dextran, and particularly the ether derived from microbiologically produced, high molecular weight dextran described in more detail below, is especially valuable for thickening and stabilizing milk and frozen milk products. These ethers have the advantage of producing significant changes in viscosity in very small amounts, considerably smaller than are required to obtain the same viscosity increase using carboxymethyl or hydroxymethyl cellulose.

The production of carboxymethyl dextrans is described in the pending application of L. J. Novak et al., Ser. No. 346,016, filed March 31, 1953, now abandoned. In brief, the selected dextran and a carboxymethylating agent are reacted together in aqueous alkaline medium whereby the carboxymethyl group is substituted for one or more hydroxyl groups in the dextran molecule. Suitable carboxymethylating agents are chloracetic acid, sodium chloracetate or chloracetamide.

The reaction is carried out in an aqueous solution of a strong alkali metal hydroxide such as sodium, potassium or lithium hydroxide. Preferably, the dextran is treated, in aqueous solution or suspension, with an excess of sodium or potassium chloracetate in the presence of an excess of sodium or potassium hydroxide at a temperature of 50° C. to 100° C. for from ten minutes to two hours. Also preferably, the molar ratio of sodium chloracetate or potassium chloracetate to dextran is between 2:1 and 12:1, the molar ratio of sodium hydroxide or potassium hydroxide to dextran is between 5:1 and 15:1, and the molar ratio of the water to dextran is between 70:1 and 120:1. The carboxymethyl dextrans so obtained have a D. S. (degree of substitution or average number of carboxymethyl groups per anhydroglucopyranosidic unit) of less than 1:1 to 3:1.

The reaction product is a viscous mass comprising the sodium or potassium salt of the carboxymethyl dextran. This viscous mass comprising the salt of the ether may be precipitated from the crude reaction mass by a nonsolvent for the salt, as by means of any water-miscible alcohol, e. g., methyl, ethyl, propyl, isopropyl or t-butyl alcohol or a water-miscible ketone such as acetone.

The free carboxymethyl dextran may be recovered from the salt by mixing the latter with water, acidifying to pH about 2.0, and precipitating the ether by means of acetone or an alcohol as described above. The pH of 2.0 is not critical and the precipitation may be effected at other pH values on the acid side. However, the highest yields of the free ether have been obtained by precipitation at pH about 2.0.

The dextran carboxymethylated may be obtained in various ways. It may be biosynthesized from sucrose by microorganisms of the *Leuconostoc mesenteroides* and *L. dextranicum* types, or their enzymes. Microorganisms (or their enzymes) which may be used include those bearing the following NRRL (Northern Regional Research Laboratory) designations: *Leuconostoc mesenteroides* B-512, B-1208; *Streptobacterium dextranicum* B-1254.

The dextran is produced by introducing a culture of the microorganism, or the enzyme recovered from the culture by filtration, into an aqueous sucrose-bearing medium and holding the mass until the dextran is synthesized in maxium yield, after which it is precipitated by the addition of a water-miscible aliphatic alcohol or ketone. The precipitated "native" dextran is purified and preferably reduced to fine powder form for carboxymethylation.

This "native" dextran is usually characterized by a very high molecular weight calculated to be in the millions. It may be converted to the ether at the native molecular weight or it may be partially hydrolyzed to lower molecular weight dextran, as by acid or enzyme action.

In all cases, relatively small amounts of the carboxymethyl dextran are effective as stabilizing and bodying or thickening agents for the milk or frozen milk products. However, the presently preferred stabilizer and thickener for addition to the milk product at any appropriate stage of its preparation, is the carboxymethyl ether derived from the native unhydrolyzed dextran produced by *Leuconostoc mesenteroides* B-512 or a dextran equivalent to such native, unhydrolyzed material, and containing an average of 2.0 to 3.0 carboxymethyl groups per anhydroglucopyranosidic unit. This ether is preferred because of its striking thickening and stabilizing effect on the milk products at extremely small concentrations. Thus amounts of the ether between 0.01% and 0.5% by weight of the total composition produce a pronounced increase in the viscosity.

The carboxymethyl dextran is much more effective than available carboxymethyl cellulose as thickener and stabilizer. For instance, the amount of carboxymethyl cellulose required to produce a given increase in the body and thickness of the milk products is approximately five times the amount of the carboxymethyl dextran required for the same effect. The marked effectiveness of the carboxymethyl dextran at the very low concentrations not only reduces the cost of the final compositions but insures that the compositions contain a minimum amount of "foreign" material.

For reasons of efficiency and economy in making ice cream, the rate at which the mix can be cooled is important. The mixes are prepared by heating the basic ingredients to elevated temperature, adding the stabilizer and, after holding the mix for a short time of the order of 30 minutes or so, homogenizing the mix under pressure. The homogenous mixture is preferably cooled by allowing it to flow over the surface of a suitable cooler, such as the cooled surface of a rotating drum or the like, the cooling being followed by the final step, freezing. It is important that the mix cool rapidly. The carboxymethyl dextran, especially the preferred ether, stabilizes and thickens the mixture to the desired consistency without rendering the mix so viscous that flow thereof over the cooling surface is impeded.

The cooled mix containing the carboxymethyl dextran may be whipped and frozen and, as a general rule, does not require ageing between the cooling and freezing treatments.

The following example is illustrative of a specific embodiment of the invention, it being understood that this example is not intended as limitative.

About 10% by weight of butterfat, 10% of serum solids and 15% of sugar are mixed and heated to about 70° C. About 0.01% of powdered carboxymethyl dextran derived from native unhydrolyzed *Leuconostoc mesenteroides* B-512 dextran containing an average of 2.8 carboxymethyl groups per A. G. U. is stirred into the mix and the mass is held at about 70° C. for about 30 minutes, after which it is homogenized at 2500# pressure and poured over a cooling surface maintained at about 10° C. After cooling, the mixture is whipped and frozen in a counter type freezer to 100% overrun and hardened in the usual manner. Pint cartons are submitted to the usual heat shock and shrinkage tests. The stored samples do not show any substantial shrinkage or ice crystal growth.

Heretofore, it has been the common practice, in making ice cream, to introduce the stabilizer into the basic mix in conjunction with a dispersing agent. Sugar, dextrine and milk powder have been used as the dispersing agent. Such dispersants are not required when the carboxymethyl dextran is used as stabilizer and bodying adjuvant, and are usually omitted.

Buffering substances, that is substances which have a buffering action on the calcium ions of the milk, may be added to the mix with the carboxymethyl dextran. Such useful buffers include the alkali metal phosphates such as trisodium phosphate, sodium tetraphosphate and sodium hexametaphosphate, used in the conventional small amounts, if at all.

Although the stabilized and bodied milk products have been discussed in detail in connection with ice cream, the invention is not limited to such frozen products. Other milk products, such as chocolate milk may have the carboxymethyl dextran incorporated therein for maintaining cocoa or chocolate particles uniformly dispersed in the liquid phase and preventing settling of the particles. The carboxymethyl dextran may also be incorporated in processed cheese for imparting body thereto and preventing drainage of serum from the finished product.

The base product having the stabilizing carboxymethyl dextran incorporated therein may be concentrated or dry whole milk solids which, after addition of the protective ether, may be canned for subsequent reconstitution by the addition of water to obtain a stable fluid milk having essentially the taste and flavor of fresh milk. Or the concentrated milk containing the carboxymethyl dextran may be frozen, subsequently thawed, and mixed with water to obtain a fresh-tasting, wholesome fluid milk.

While certain specific embodiments of the invention have been described, it is not intended to limit or circumscribe the invention by the details given, since the invention is susceptible of various modifications and changes which come within the spirit and scope of the disclosure and appended claims.

What is claimed is:

1. An ice cream mix containing from 0.01% to 0.5% by weight of a carboxymethyl ether of a native, unhydrolyzed, water-soluble dextran characterized in that 90% to 97% of the linkages joining the anhydroglucopyranosidic unit are 1,6 linkages, said ether containing an average of from about 2.0 up to 3.0 carboxymethyl groups per anhydroglucopyranosidic unit of the dextran.

2. Ice cream containing from 0.01% to 0.5% by weight of a carboxymethyl ether of native, unhydrolyzed, water-soluble dextran characterized in that 90% to 97% of the linkages joining the anhydroglucopyranosidic unit are 1,6 linkages, said ether containing an average of from about 2.0 up to 3.0 carboxymethyl groups per anhydroglucopyranosidic unit of the dextran.

3. The method of making an improved ice cream which comprises the step of incorporating from 0.01% to 0.5% of a carboxymethyl ether of native, unhydrolyzed, water-soluble dextran characterized in that 90% to 97% of the linkages joining the anhydroglucopyranosidic units are 1,6 linkages, said ether containing an average of 2.0 to 3.0 carboxymethyl groups per anhydroglucopyranosidic unit, with a blend of basic ingredients including butter fat, sugar and serum solids, prior to homogenizing and freezing the blend.

References Cited in the file of this patent

UNITED STATES PATENTS

| | | |
|---|---|---|
| 2,089,217 | Mahoney | Dec. 29, 1934 |
| 2,267,911 | Grettie et al. | Dec. 30, 1941 |
| 2,409,816 | Wadsworth | Oct. 22, 1946 |
| 2,602,082 | Owen | July 1, 1952 |
| 2,609,368 | Gaver | Sept. 2, 1952 |

OTHER REFERENCES

Pigman et al.: Advances in Carbohydrate Chemistry, vol. 4, New York, page 333.

Gould: The Ice Cream Trade Journal, vol. 29, April 1933, page 40.

Josephson et al.: The Ice Cream Review, June 1945, page 80.

"Bacterial Polysaccharides," by T. H. Evans and H. Hibbert, Scientific Report Series No. 6, Sugar Research Foundation, Inc., New York, April 1947, pages 216 to 219.